US010395077B2

(12) United States Patent
Younger et al.

(10) Patent No.: US 10,395,077 B2
(45) Date of Patent: Aug. 27, 2019

(54) SYSTEM AND METHOD FOR NEAR FIELD COMMUNICATION

(71) Applicant: HALLMARK CARDS, INCORPORATED, Kansas City, MO (US)

(72) Inventors: Max J. Younger, Roeland Park, KS (US); Christian Cochran, Kansas City, MO (US)

(73) Assignee: Hallmark Cards, Incorporated, Kansas City, MO (US)

( * ) Notice: Subject to any disclaimer, the term of this patent is extended or adjusted under 35 U.S.C. 154(b) by 194 days.

(21) Appl. No.: 14/599,188

(22) Filed: Jan. 16, 2015

(65) Prior Publication Data

US 2015/0205990 A1 Jul. 23, 2015

Related U.S. Application Data

(60) Provisional application No. 61/928,989, filed on Jan. 17, 2014.

(51) Int. Cl.
*G06K 7/10* (2006.01)
*H04B 5/00* (2006.01)
(Continued)

(52) U.S. Cl.
CPC ..... *G06K 7/10386* (2013.01); *G06K 7/10237* (2013.01); *H04B 5/0031* (2013.01);
(Continued)

(58) Field of Classification Search
CPC .......... G06K 7/10386; G06K 7/10237; H04B 5/0031; H04B 5/0037; H04B 5/0062;
(Continued)

(56) References Cited

U.S. PATENT DOCUMENTS 8,462,079 B2 6/2013 Piccionelli
8,584,946 B2 11/2013 Morley, Jr.
(Continued)

FOREIGN PATENT DOCUMENTS

WO 2012170924 A2 12/2012
WO 2013142913 A1 10/2013

OTHER PUBLICATIONS

International Search Report with Written Opinion dated May 4, 2015 in Application No. PCT/US2015/011874, 10 pages.
(Continued)

*Primary Examiner* — Patrick N Edouard
*Assistant Examiner* — Eboni N Hughes
(74) *Attorney, Agent, or Firm* — Shook, Hardy and Bacon, L.L.P.

(57) ABSTRACT

Systems, methods, and devices are provided for a near-field communication (NFC) system for use with mobile computing device. In an embodiment, an RFID reader device is configured for operation with a smart phone using the audio (headphone) port, and which is entirely powered and controlled by the mobile computing device through the audio port. A specially tuned charge pump ladder is used for powering the RFID reader device over a TRRS connection with the mobile computing device, without requiring an internal power source, such as a battery, in the RFID reader device. In an embodiment, an app running on the mobile computing device includes functionality for providing power and data channels over the TRRS port to the RFID reader device.

19 Claims, 9 Drawing Sheets

(51) Int. Cl.
*H04W 4/80* (2018.01)
*H04M 1/725* (2006.01)

(52) U.S. Cl.
CPC ......... *H04B 5/0037* (2013.01); *H04B 5/0062* (2013.01); *H04W 4/80* (2018.02); *H04M 1/72527* (2013.01); *H04M 2250/04* (2013.01)

(58) Field of Classification Search
CPC .......... H04M 1/7253; H04M 1/72527; H04M 2250/04; H04W 4/008
See application file for complete search history.

(56) References Cited

U.S. PATENT DOCUMENTS

| 2006/0250250 | A1* | 11/2006 | Youn | G06K 19/07749 340/572.7 |
| 2009/0121837 | A1* | 5/2009 | Kitayoshi | G06K 19/0713 340/10.1 |
| 2012/0313746 | A1 | 12/2012 | Rahman et al. | |
| 2013/0201140 | A1 | 8/2013 | Piccionelli | |
| 2013/0225077 | A1 | 8/2013 | Schultz et al. | |
| 2013/0178149 | A1 | 11/2013 | Mankaruse et al. | |
| 2014/0027519 | A1 | 1/2014 | Itay et al. | |

OTHER PUBLICATIONS

FloJack/FloCase—NFC Reader/Writers for iPhone and iPad, http://www.kickstarter.com/projects/flomio/flojack-nfc-for-ipad-and-iphone, 23 pages.

Office Action dated May 17, 2017 in Canadian Patent Application No. 2,937,102, 4 pages.

Office Action dated Mar. 21, 2019 in Canadian Patent Application No. 2,937,102, 5 pages.

* cited by examiner

SYSTEM AND METHOD FOR NEAR FIELD COMMUNICATION

CROSS-REFERENCE TO RELATED APPLICATIONS

This application claims the benefit of U.S. Provisional Application No. 61/928,989, filed Jan. 17, 2014, entitled "System And Method For Near Field Communication," which is hereby expressly incorporated by reference in its entirety.

BRIEF SUMMARY OF THE INVENTION

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter.

In brief and at a high level, this disclosure describes, among other things, systems and methods for using, a near-field communication (NFC) system for use with a mobile computing device or other smart device, such as a smart phone or camera. In particular, an embodiment of the invention is directed to a radio frequency identification (RFID) reader device configured for operation with a smart phone using the audio (headphone) port, and which is entirely powered and controlled by the smart device through the audio port. In an embodiment, a specially tuned charge pump ladder is used for powering the RFID reader device over a tip-ring-ring-sleeve (TRRS) connection, without requiring an internal power source, such as a battery. In an embodiment, a pulse modulation or duty cycle is used for powering the RFID reader device, in order to conserve power and increase the range of the tag detection. Further, in some embodiments, and app running on the smart device sends control information over the TRRS connection to the RFID reader to control operation times and power levels, furthering energy conservation, range, and/or preserving battery levels of the smart device.

A user using an embodiment of the invention plugs the RFID reader device into their headphone port on their smart device. Using an app on the smart device, an object having an embedded RFID (or other NFC) tag is detected and the user is provided with a user experience, such as a video of a product demonstration, a user-supplied video or photo, or supplemental information associated with the object. In an embodiment, the RFID reader is capable of detecting the tag regardless of its rotational orientation in the smart device plug. In some embodiments, when the user places the RFID reader in the smart device, an app running on the smart device sends out a signal that powers the RFID reader device for reading an RFID tag. In these embodiments, the smart device powers the reader device or augments onboard power to recharge the reader device for performing the RFID operation. In some embodiments, the RFID tag values correspond to a reference or address for the supplemental information. For example, a tag may reference a database where content is associated with the tag. In some embodiments the app further facilitates retrieving and presenting the associated content on the smart device. In some embodiments, content may be supplied by a vendor, advertiser, other third party, or is creased or supplied by the user.

BRIEF DESCRIPTION OF THE DRAWINGS

Illustrative embodiments of the invention are described in detail below with reference to the attached drawing figures, and wherein.

DETAILED DESCRIPTION OF THE INVENTION

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

As one skilled in the art will appreciate, embodiments of our invention may be embodied as, among other things: a method, system, or set of instructions embodied on one or more computer-readable media. Accordingly, the embodiments may take the form of a hardware embodiment, a software embodiment, or an embodiment combining software and hardware. In one embodiment, the invention takes the form of a computer-program product that includes computer-usable instructions embodied on one or more computer-readable media.

Computer-readable media include both volatile and nonvolatile media, removable nonremovable media, and contemplate media readable by a database, a switch, and various other network devices. By way of example, and not limitation, computer-readable media comprise media implemented in any method or technology for storing information, including computer-storage media and communications media. Examples of stored information include computer-useable instructions, data structures, program modules, and other data representations. Computer-readable media includes communications media and storage media. Computer storage media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, other magnetic storage devices, and other hardware storage devices. These technologies can store data momentarily, temporarily, or permanently.

Embodiments of the invention are directed to methods, systems, devices, and computer-readable media for an NFC system for use with a portable computer or smart device, such as a smart phone or camera. One embodiment of the invention is directed to an RFID reader device configured for operation with a smart phone using the audio (headphone) port, and which is powered by and controlled by the smart device through the audio port. In particular, in an embodiment, the NFC system is operated using energy supplied by the smart device, without requiring a battery or internal power source in the NFC reader device, through the use of: a tuned charge pump ladder for accumulating energy to power an RFID communication session; a modulated signal having a specially configured duty-cycle for transmitting energy to the NFC reader device over a first audio channel, for powering the RFID reader device; and an application (or app) running on the smart device for facilitating generation and control of the modulated signal, as well as control of the NFC reader device over a second audio channel. In this manner, embodiments of the invention allow operation of the NFC system without the need of an internal power source (battery), thereby enabling a smaller form factor. Further, embodiments facilitate conserving power of the smart device and increasing the range of use for detecting NFC tags, without requiring an internal power source or using a proprietary port on the smart device.

In an embodiment, a system provides an NFC session with an NFC-tagged object. The system includes a TRRS component configured to be inserted into an audio port on a smart device and including at least three channels. The system also includes an NFC component for transmitting a first radio frequency (RF) signal and for receiving a second RF signal which includes identifying information. The NFC component is further configured to decode the second RF signal to determine the identifying information. The system additionally includes an energy-collecting component configured to store energy from a modulated power signal, and also configured to supply energy in a burst to the NFC component for use in transmitting the first RF signal. A first channel of the TRRS channels is configured for receiving power, a second channel is configured for receiving control signals, and a third channel is configured for communicating tag value information.

In another embodiment, a device provides electrical power. The device includes a TRRS component including at least 3 channels, and an energy-collecting component configured to store energy from a modulated power signal. The energy-collecting component is also configured to supply energy in a burst. A first channel of the TRRS component is configured for receiving power.

In another embodiment, a method provides an NFC session with an NFC-tagged object. The method includes receiving a first signal via a first channel of a TRRS connector, and providing the first signal to an energy-collecting component that stores energy from the first signal. Stored energy from the first signal is utilized to power an NFC component that retrieves information from an NFC tag. A second signal is received via a second channel of the TRRS connector, and one or more control signals are determined from the second signal. The one or more control signals are utilized to control the NFC communication component. The information retrieved from the NFC tag by the NFC component is received, and at least a portion of the retrieved information is communicated via a third channel of the TRRS connector.

Figure 1A:
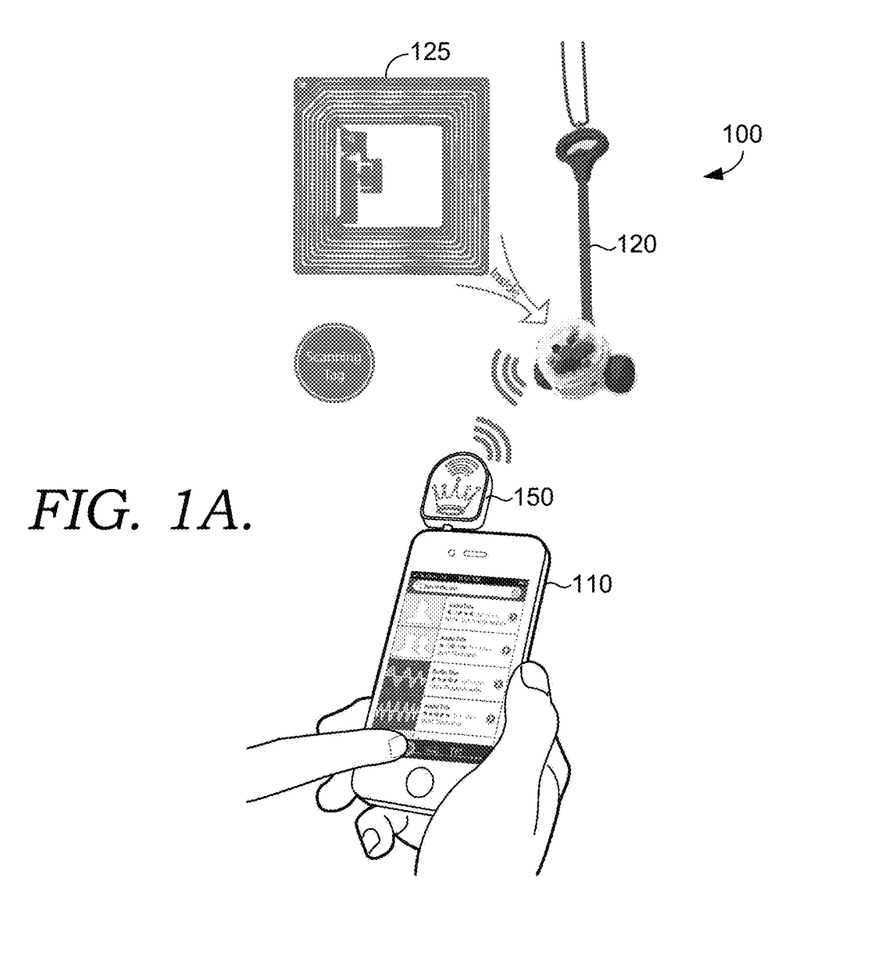
FIGS. 1A-1C depict aspects of an NFC device and using the NFC device in an operational environment, in accordance with embodiments of the present invention.
Figure 1B:
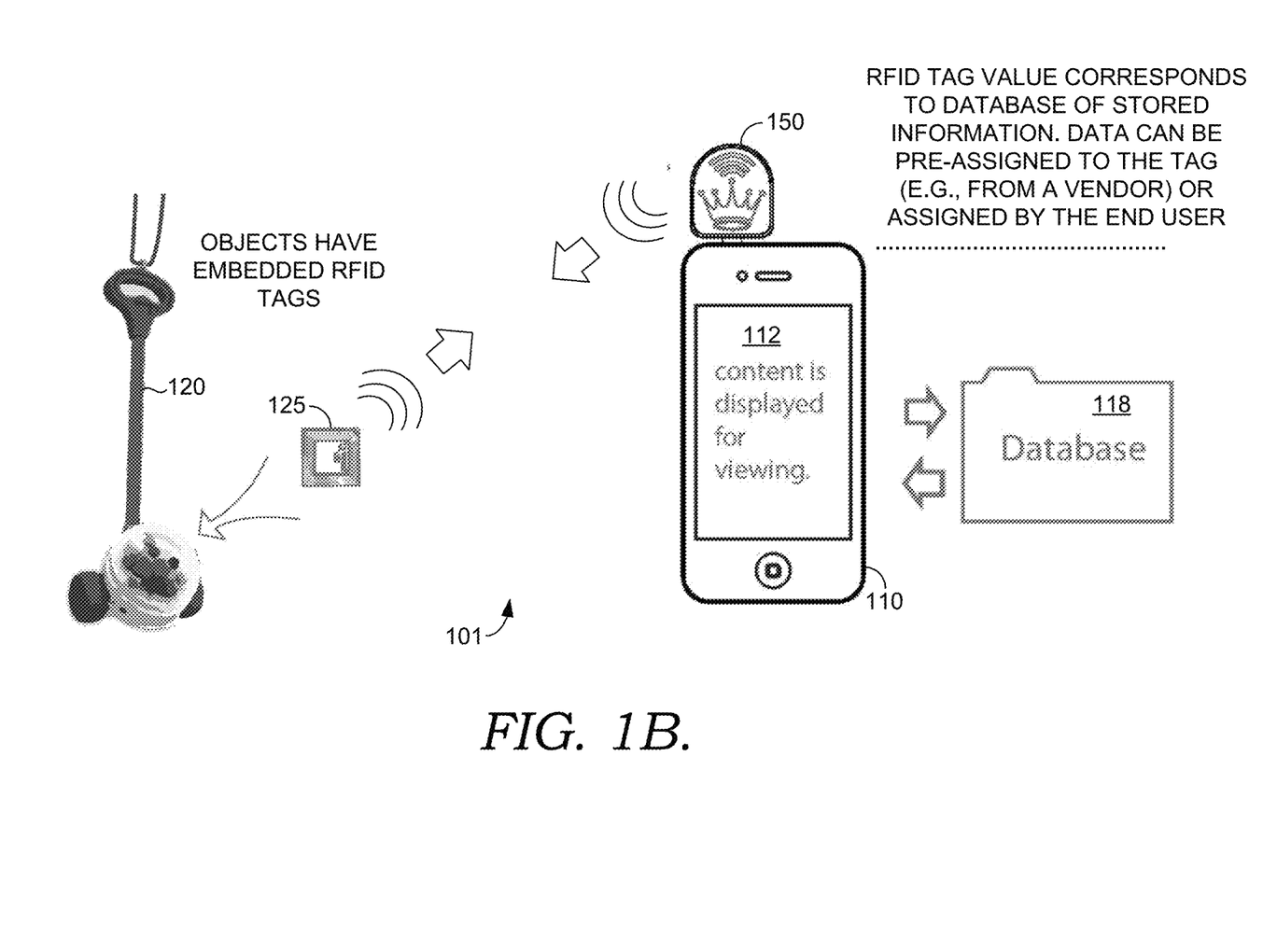
Figure 1C:
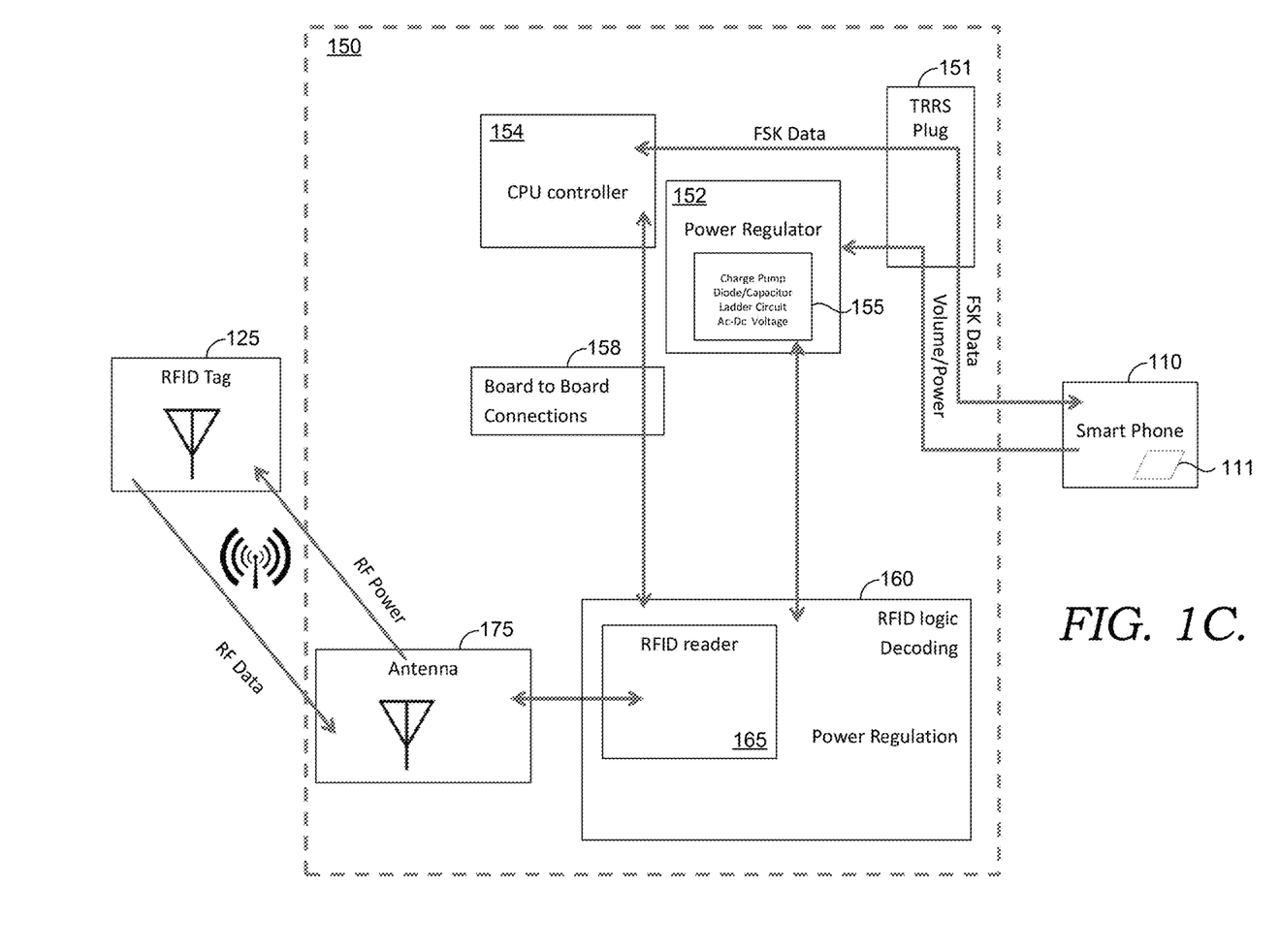

With reference to FIGS. 1A-1C, aspects of an NFC system are provided including example operating environments for embodiments of the NFC system, which is referred to herein as operating environments 100 and 101. Operating environment 100, shown in FIG. 1A, and operating environment 101, shown in FIG. 1B, includes smart device 110, communicatively coupled via a TRRS-type port to NFC device 150, which in some embodiments detects (reads) periodically or on demand, an NFC tag 125 in an object 120. In embodiments, smart device 110 comprises a smart phone, tablet computer, camera, MP3 or portable music player, portable gaming system, PDA, or mobile computing device. Object 120 comprises any physical object, surface, or location capable of having an NFC tag 125 attached, embedded, printed, or otherwise associated therewith. Embodiments of NFC tags 125 include RFID tags, which maybe passive or active, other NFC receiver-transmitter, or reflector technologies including magnetic, electric, and radio-frequency (RF) type technologies. Each tag includes an identifier, which may be a unique or rare value of a code usable for identification. In some embodiments, the tag is an RFID tag, and the identifier is the RFID code or tag value, which is determined by reading the tag with an RFID reader. In particular, an RF signal emitted by the tag 125 includes information identifying the tag value, and is emitted in response to receiving an RF signal by an RFID reader tuned to operate with the RFID tag, and in some embodiments, powered by the energy received from the waveform of the RF signal emitted by the RFID reader.

In embodiments, tags 125 may be embedded in or on products including marketing materials, store displays or advertising materials, positioned at certain locations for use in navigation systems, such as would enable a user to navigate, find directions, or way-finding, by scanning tags positioned at geographic locations. Tags may be embedded (or otherwise associated with an object 120) by object 120 manufacturer, vendor, or an end user.

With reference to FIG. 1B, in an embodiment, a tag 125 is indexed to object 120 or otherwise associated with information corresponding 112 to object 120. Supplemental information 112 (or content 112) includes the information to be associated with object 120, such as content from a manufacturer, vender, or user. For example, in some embodiments, this content 112 can include demos of the object, instructions, directions or location information, photos or videos related to the object, applications, games, or any content including content suitable for reference, access, or presentation on smart device 110. In an embodiment, a user can personalize a tag by associating content 112 determined by the user. For example, user-provided content 112 might include a game for that object (or game played with the object), user-created video, an interview of the artist, or content a user associates to that object. In some embodiments, an account associated with the user is used for facilitating the user's association of objects with user content. In these embodiments, database 118 may also include information for identifying the user account. In an embodiment, a user can associate pictures, video, or audio to a tag such that when the tag is detected by the NFC reader device 150, the content 112 is displayed on the smart device 110. In an embodiment, a user can choose to "share" their content 112 that they associated with a tag 125 privately to another user or to their friends or publicly, such as via social network sites. In an embodiment, a single tag's information may be copied by a user's account and associated to multiple tags 125, and in an embodiment, tags 125 could have pre-associated content 112 such as Hallmark created content, which may be presented to the user on smart device 110 in response to detecting a tag. For example, turning briefly to FIGS. 3B and 3C, object 121 comprise a Christmas tree ornament having an embedded tag 125. In response to detecting the tag 125, the user is presented a holiday video.

Returning to FIG. 1B, Operating environment 101 includes database 118. In an embodiment, database 118 includes an association of tag identifiers (tag values) and addresses for accessing supplemental information 112 associated with the object 120, such as content to be presented to the user upon detecting a particular tag. In some embodiments, database 118 also includes the supplemental information 112. In embodiments, database 118 can be stored on smart device 110 or stored at another location such as on a server, or in the cloud. In some embodiments, a user can modify the contents of database 118 such as by providing entries of user-defined tag-object-information associations into database 118. For example, a user might associate a video recording of a toddler (content 112) using a toy (object 120) having a tag 125 embedded in the toy. In this example, after detecting the tag 125 in the toddler's toy, database 118 is accessed. From the tag identifier determined by reading the tag 125, the address of the supplemental information 112 (the video) corresponding to the tag identifier is determined and the supplemental information 112 (the video) is accessed, and presented on the screen of smart device 110.

Turning now to FIG. 1C, an aspect of an NFC device 150 and its operation is illustratively provided. The aspect presented in FIG. 1C includes components described in connection to FIGS. 1A and 1B, including a tag 125 (RFID tag 125), smart device 110 (smart phone 110), and NFC device 150.

Embodiments of smart device 110 include a software application 111 (app 111), which may be embodied as an app, program, or software routine running on smart device 110. Embodiments of app 111 facilitate accessing database 118 based on received tag identifier information and displaying content 112 to a user. In an embodiment, app 111 also facilitates controlling and operating NFC device 150. For example, in an embodiment, data is communicated (via a TRRS channel) with NFC device 150 using frequency shift keying (FSK). App 111 facilitates this communication by encoding and decoding the FSK information. In an embodiment, the FSK modulated signal is specially created for proper pulse timing and data transmission using only a single pin output. In particular, for certain smart devices such as the iPhone® by Apple®, pin usage of the TRRS connectors must be carefully coordinated so as to avoid confusion by other software operating on the iPhone. For example, such smart devices require the correct resistive values connected to the pins, in order for the phone to interpret correctly. In an embodiment, app 111 controls the power signal to NFC device 150. For example, in an embodiment, app 111 facilitates (a) generating a specific power signal by determining the parameters associated with the signal, such as frequency, amplitude, and/or duty cycle of the signal to correspond to a tuned energy-collecting circuit in device 150; (b) automatically "turning up the volume" (increases the power) to the TRRS channel used for supplying power; and (c) panning the power signal to specific channel used for power (e.g., either left or right audio channel), so that the other channel (left or right) may be used for sending controller information to the device 150 and the microphone channel used for receiving the RFID information from the tag 175. In an embodiment, app 111 also facilitates power regulation of device 150, as described below.

Embodiments of app 111 prevent battery drain by intelligently controlling power to device 150. Running the NFC (RFID) transmitters too long would result in draining the available power out of the smart device 110. Thus in embodiments, as described elsewhere herein, a pulse modulation, or duty cycle, is used for running the RFID transmitter to conserve power. In an embodiment, it is only searching for a single protocol at a given duty cycle so it does not use up all the stored energy. Therefore, it allows the voltage of the system to stay adequate to run the system. Moreover, as described below, app 111 facilitates the timing of the transmit bursts (NFC communication sessions), which further helps with energy conservation, and may be controlled by the user settings or application. One embodiment of the NFC system described herein and in particular of app 111 includes functionality for providing a voltage level feedback loop. The feedback loop provides data to the app 111 for automatic voltage adjustment to the device by changing the power signal parameters (such as frequency and amplitude) as necessary.

Embodiments of NFC device 150 comprise components for power regulation, near-field communication antenna, control and decoding logic, and communication component for communicating to smart device 110. As shown in the example embodiment of NFC device 150 provided in FIG. 1C, device 150 includes tip-ring-ring-sleeve (TRRS) plug component 151, which is configured to connect with smart device 110 using an audio (headphone) port. A TRRS-type port includes 4 channels, which are typically: left, right, microphone, and ground. In some embodiments of device 150, one channel of the TRRS is used for data communication with smart phone 150, one channel is used for supplying power to device 150, including power for driving NFC communication, and one channel is used for controlling device 150 or providing data to device 150, such as may be used for writing NFC tag identifier information or diagnostics. In an embodiment, the left channel is used for this operation, the right channel is used to power the device 150, and the microphone channel is used for data communication, which includes communicating the tag information to smart device 110.

Example device 150 also includes a CPU controller 154, board-to-board connections 158, which include control logic or physical connections between the physical components of device 150, RFID (or NFC) logic decoding component 160, antenna 175, and power regulator component 152. In one embodiment, CPU controller 154 comprises a processor or micro controller, for operating device 150 and facilitating communication with smart device 110. For example, controller 154 may be used for controlling NFC communication sessions including controlling other components of device 150, regulating power, and controlling communication with smart device 110, by modulating and/or demodulating FSK signals, in an embodiment. In an embodiment, RFID logic decoding component 160 includes RFID reader 165, which together with other features of decoding component 160 facilitates reading and decoding the RFID tag identifiers or values, received as RF data by antenna 175. In some embodiments, component 160 includes power regulation functionality, which may be controlled by CPU controller 154 or software application 111 running on smart device 110. In particular, power regulation may be used to control power levels for an RFID communication session and how often the RFID read signal is transmitted. In an embodiment, an RFID read signal is transmitted only every 1.5 seconds, rather than continuously. In an embodiment, app 111 running on device 110 intelligently controls RFID component 160 (via communication over a channel in the TRRS port) such that an RFID read signal is only transmitted when a user or the app has initiated it. In some embodiments, motion or camera information of the smart device is used to determine whether the user is intending to perform an RFID communication session. For example, where a user has already performed an RFID operation and is presently viewing content 112 on the smart device, app 111 may communicate control information to NFC device 150 to power down, stand-by, or otherwise limit power consumption because the user is not likely desiring to perform an RFID (or NFC) communication.

Example device 150 also includes a Power regulator 152 for performing power regulation of device 150. Efficient power management is an important consideration in order for NFC device 150 to run using power of the smart device 110 battery. Power regulator 152 includes an energy-collecting component such as component 155. In an embodiment, component 155 comprises a charge-pump ladder circuit. Or one or more voltage-doubler/voltage-multiplier circuits, such as one or more Dickenson charge-pump voltage doublers, and is configured for storing energy received by a modulated signal supplied over a TRRS channel. In an embodiment, a specially designed (or tuned) charge pump circuit switches AC to DC and increases the voltage (voltage multiplier) of a received power signal. In an embodiment, a high efficiency charge pump ladder includes an arrangement of low impedance diodes combined with low-leakage capacitors that are arranged to occupy a small form factor. In an embodiment, a high capacitance is used above the charge pump circuit to store the energy, which is released in a burst for the RF transmitter in the NFC communication session. One example embodiment of a tuned charge pump circuit for use in device 150 is provided in the schematic diagram of FIG. 2D.

Figure 2A:
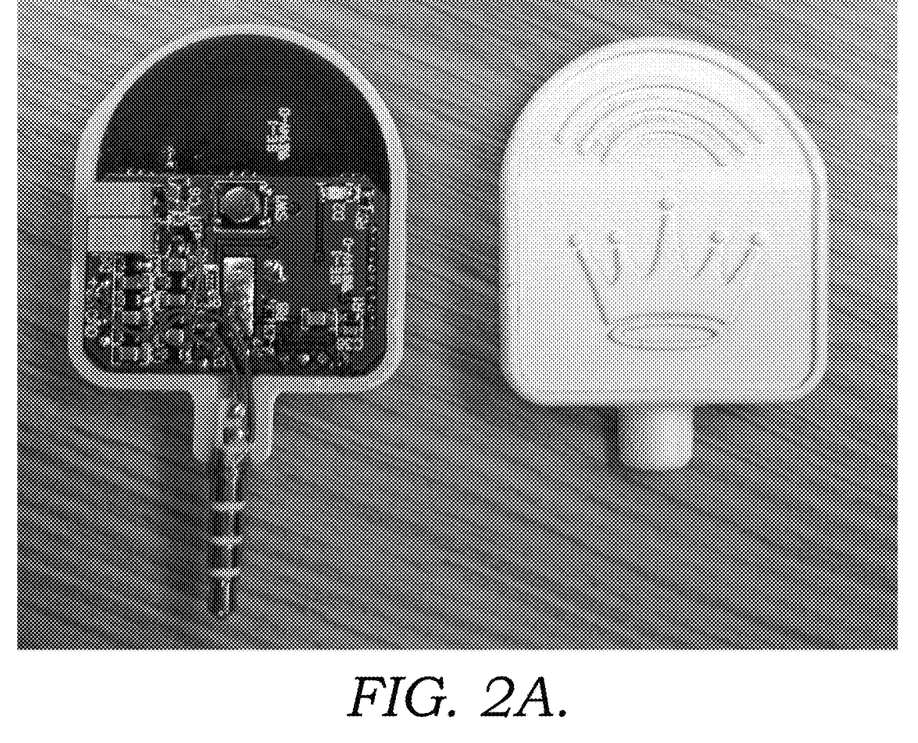
FIGS. 2A-2E depict aspects of an RFID reader device, in accordance with an embodiment of the present invention.
Figure 2B:
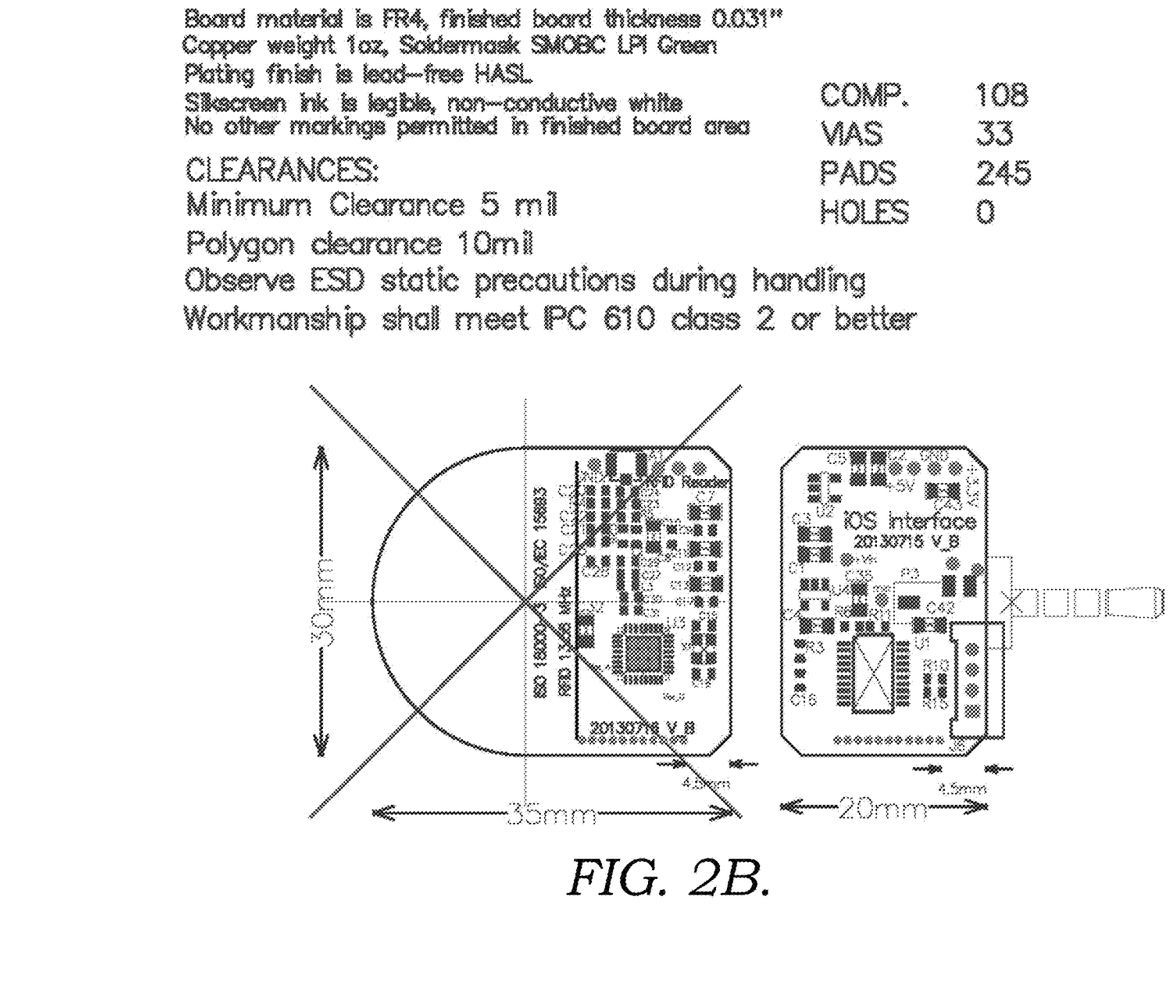
Figure 2C:
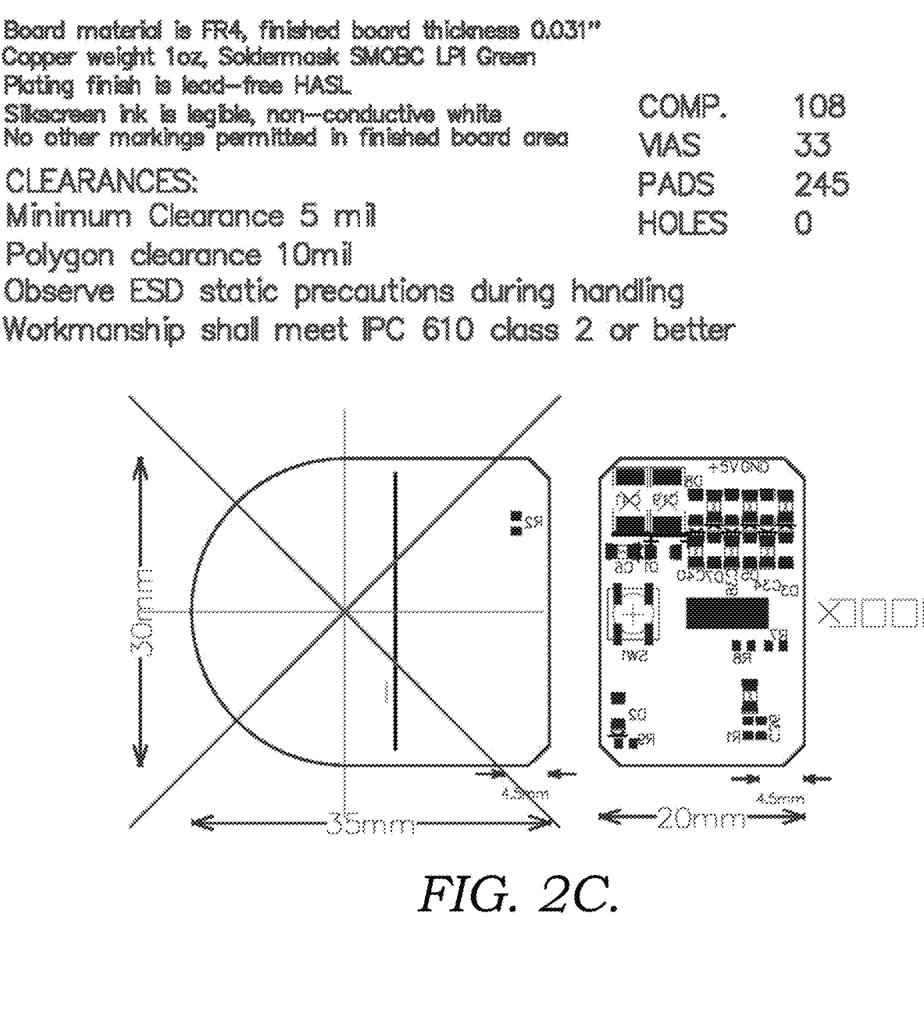
Figure 2D:
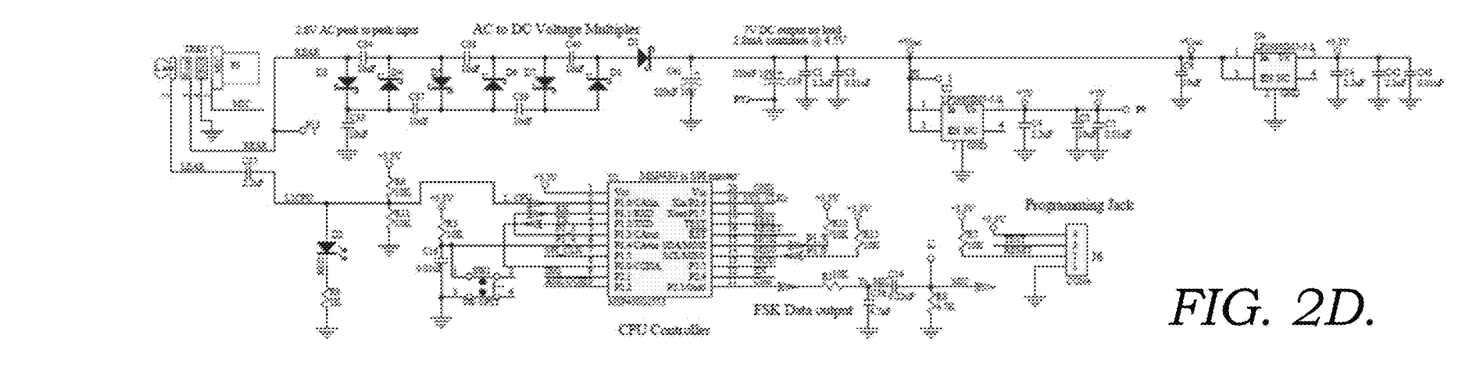
Figure 2E:
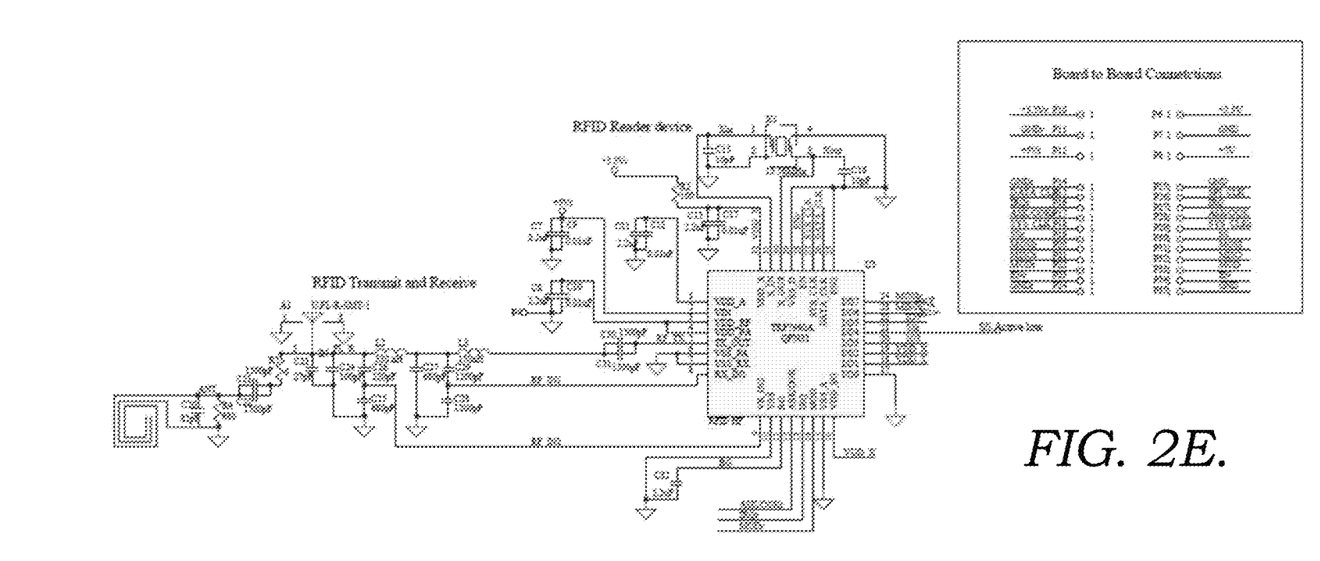

Turning now to FIGS. 2A-2E, aspects of an embodiment of NFC device 150 are provided. FIGS. 2D and 2E present circuit schematics for an embodiment of the NFC device 150, including an embodiment of the charge-pump ladder (shown in FIG. 2D) specifically tuned for operation over the TRRS port of an iPhone® or similar smart device 110. With reference to FIGS. 2A-2C, in the example embodiment provided, the RFID logic decoding component 160 and antenna 175 are positioned within NFC device 150, in a manner such that the RF transmission to a tag 175 and reception of information from the tag 175 can occur regardless of the orientation of NFC device 150 with respect to tag 175. In particular, in an embodiment, components 175 and 160 are positioned on separate circuit boards and/or positioned at the curved tip of device 150 so that RF communication with a tag 175 is unobstructed by other circuit components of NFC device 150 or smart device 110. Moreover, reducing interference of the RF communication path results in an increased range for tag detection or lower power levels necessary for RFID communication. Efficient power usage is an important consideration for powering the device over the TRRS port and when there is no onboard battery or other power source. In an embodiment, the printed circuit board layout, and shape that is purposefully designed with the square base and rounded top (antenna) is specifically designed to provide maximum antenna exposure without RF interference that of circuit boards. In such embodiments, stacking the printed circuit boards allows for organization of components into RF/data and Power management, which decreasing the overall footprint and size.

Figure 3A:
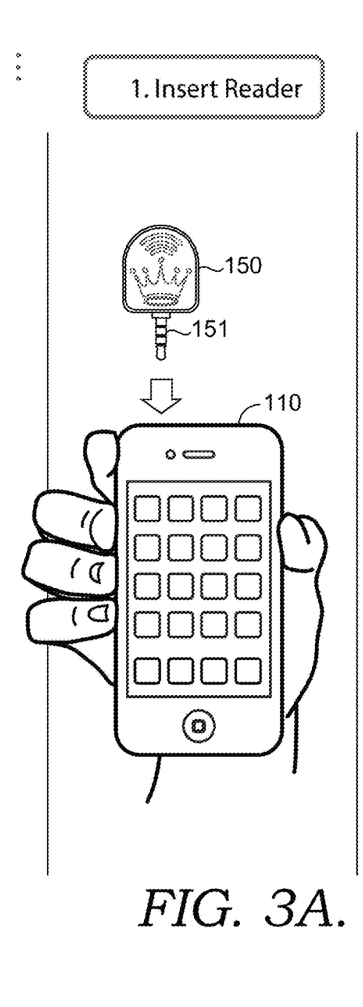
FIGS. 3A-3C depict a series of illustrations showing an example of a user using an embodiment of a the NFC device.
Figure 3B:
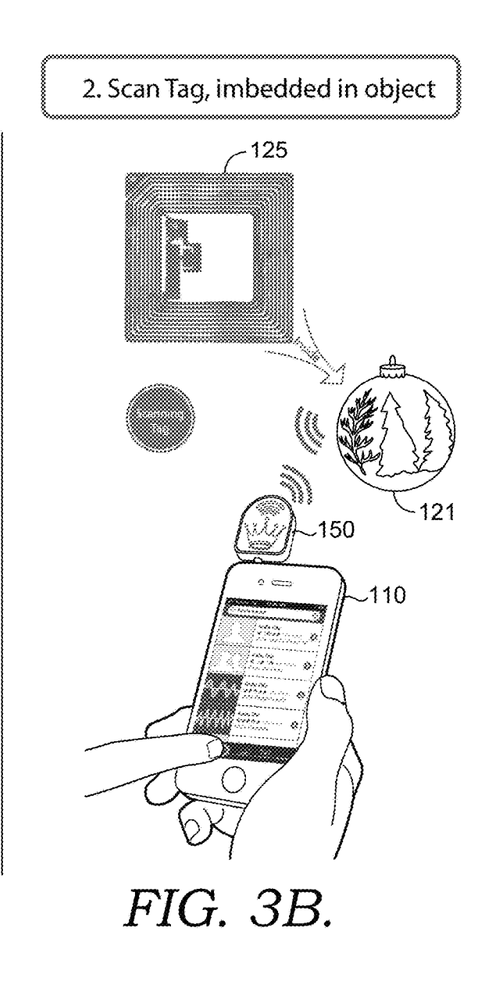
Figure 3C:
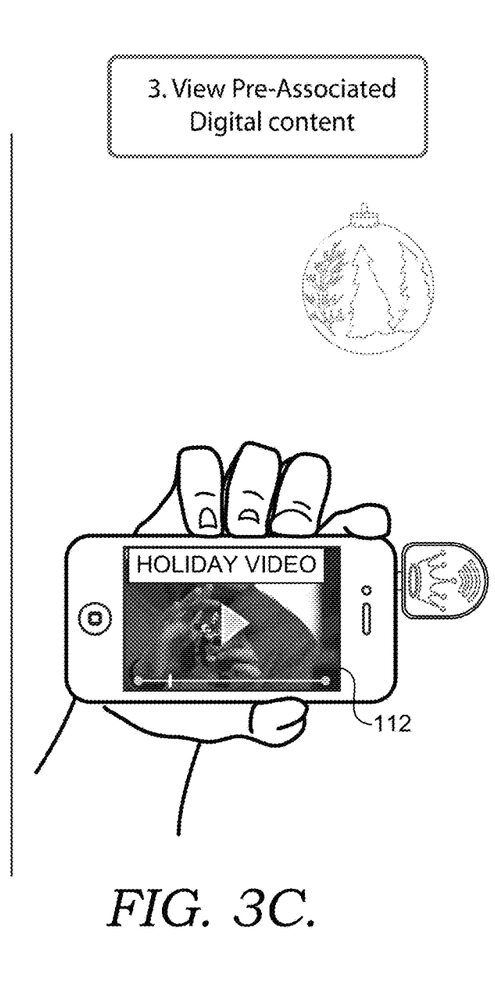

Turning now to FIGS. 3A through 3C there is provided a series of illustrations showing an example of a user using an embodiment of the NFC device, such as described in connection to FIGS. 1A-2E. In this example, the NFC device 150 is used to access $3^{rd}$-party provided content 112 (as opposed to user-provided content 112). In this example, at FIG. 3A a user first inserts the NFC device 150 into the smart device 110. Then at FIG. 3B, using app 111, the user "scans" or reads object 121, which has an embedded NFC tag 125. Here, object 121 comprises a Christmas tree ornament. The example NFC communication session between NFC device 150 and tag 125 shown in FIG. 3B proceeds as described in connection to FIG. 1C. In FIG. 3C, in response to receiving the tag value or identifier information from tag 125, app 111 determined the corresponding content 112, using database 118 (not shown) and a holiday video (content 112) is displayed to the user.

Figure 4A:
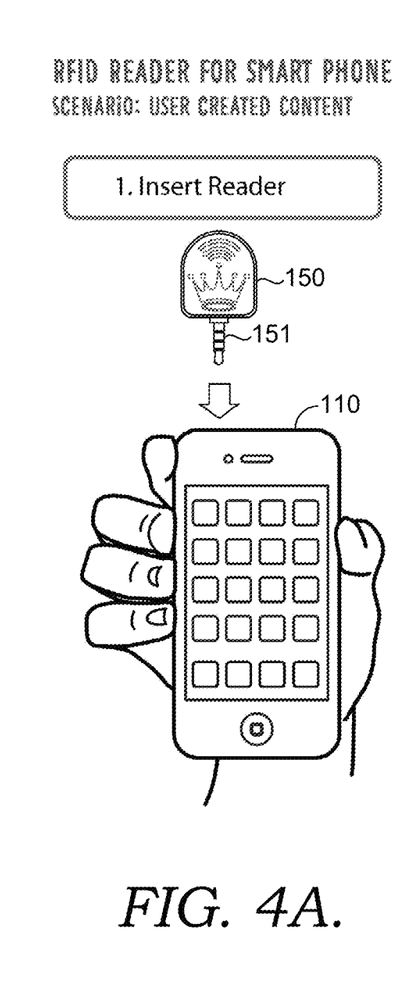
FIGS. 4A-4C depict a series of illustrations showing an example of a user using an embodiment of the NFC device.
Figure 4B:
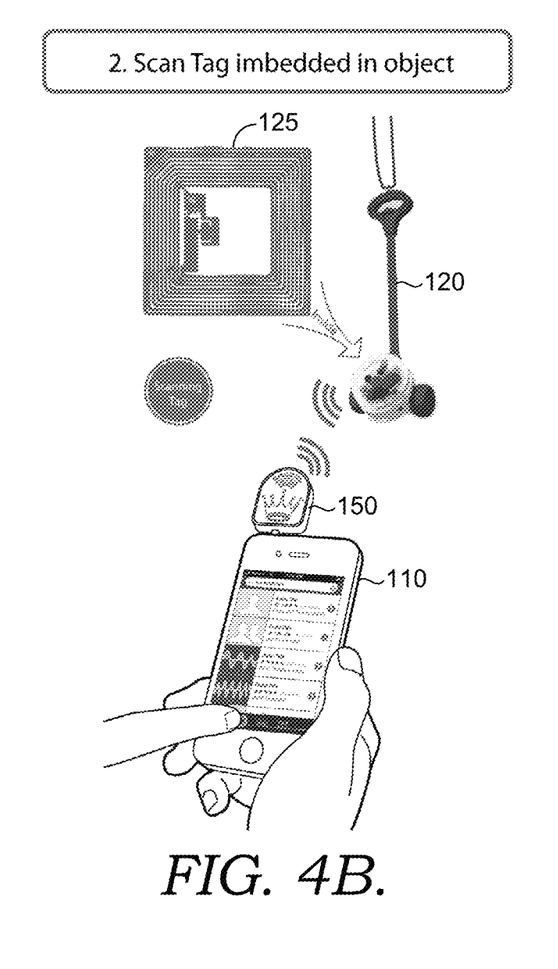
Figure 4C:
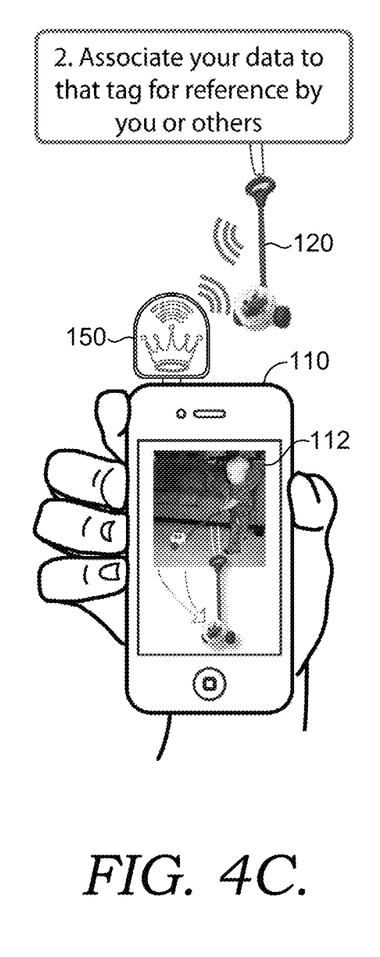

With reference now to FIGS. 4A-4C, there is provided a series of illustrations showing a second example of a user using an embodiment of the NFC device, such as described in connection to FIGS. 1A-2E. In this example, a user uses the NFC device 150 is create user-created content. The steps shown in FIGS. 4A through 4C proceed similarly to the steps discussed in FIGS. 3A through 3C.

In this example, at FIG. 4A a user first inserts the NFC device 150 into the smart device 110. Then at FIG. 3B, using app 111, the user "scans" or reads object 121, which has an embedded NFC tag 125. Here, object 120 comprises a toddler's toy. Again, the example NFC communication session between NFC device 150 and tag 125 shown in FIG. 4B proceeds as described in connection to FIG. 1C. In FIG. 4C, the user has recorded a video of the toddler using the toy, which comprises the user-created content 112. Using app 111, the user now associates content 112 (the video of the toddler playing with the tow), or an address for accessing content 112, with the tag value information determined in 4B. App 111 stores this association in database 118, and in embodiments with a user account, also stores information corresponding to the user and/or user account. Subsequently, the video of the toddler may be presented upon scanning tag 175 with NFC device 150, as described in FIGS. 3A-3C.

Many variations can be made to the illustrated embodiments of the present invention without departing from the scope of the present invention. For example, other embodiments and applications of the NFC system presented herein include integrating the NFC system into a smart device including a phone, game, or toy, for example; using the NFC system for way-finding within store environment; writing data to NFC tags; inventory management such as for retail/wholesale/distribution; medical uses, for instance where a dogs with imbedded RFID tag is used as object 120, and content (such as user created content like a video of the dog or dog-owner information) is associated with the tag; marketing and advertising uses including direct marketing and showing specified content on the smart device; at-shelf marketing/data for individual products, for example in a grocery store, when scanning a tag on a cereal box, app 111 using database 118 might filter the particular product for your profile, in case you are allergic to peanuts/gluten or other filtering criteria, make suggestions or recipes or alternative products, or provide reviews of the product. Such modifications are within the scope of the present invention.

From the foregoing it will be seen that this invention is one well adapted to attain all ends and objects hereinabove set forth together with the other advantages, which are clear following the complete disclosure above and which are inherent to the methods and apparatuses described herein. It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

The invention claimed is:

1. A system for providing a near field communication (NFC) session with an NFC-tagged object, comprising:
   a tip-ring-ring-sleeve (TRRS) component configured to be inserted into an audio port on a smart device and including at least three channels;
   an NFC component for transmitting a first radio frequency (RF) signal and for receiving a second RF signal, the second RF signal including identifying information, the NFC component further configured to decode the second RF signal to determine the identifying information; and
   an energy-collecting component comprising an energy-collecting circuit configured to store energy from a modulated power signal, increase a voltage of the modulated power signal, and supply the stored energy in a burst to the NFC component for use in transmitting the first RF signal,
   wherein the energy-collecting circuit is tuned to correspond to one or more parameters of the modulated power signal, and
   wherein a first channel of the at least three channels is configured for receiving the modulated power signal, a second channel is configured for receiving control signals, and a third channel is configured for communicating tag value information.

2. The system of claim 1, wherein the energy-collecting circuit comprises a charge pump circuit.

3. The system of claim 2, wherein the one or more parameters of the modulated power signal include one or more of a frequency, an amplitude, or a duty cycle.

4. The system of claim 1, wherein the energy-collecting circuit comprises a tuned charge pump ladder circuit.

5. The system of claim 1, further comprising a printed circuit board layout and shape having a square base and rounded end, wherein the NFC component includes an antenna that is positioned at the rounded end.

6. A device for providing electrical power, comprising:
   a tip-ring-ring-sleeve (TRRS) component including at least 3 channels;
   an energy-collecting component comprising an energy-collecting circuit configured to store energy from a modulated power signal, increase a voltage of the modulated power signal, and supply the stored energy in a burst,
   wherein a first channel of the TRRS component is configured for receiving the modulated power signal.

7. The device of claim 6, wherein the energy-collecting circuit is tuned to correspond to one or more of a frequency, an amplitude, or a duty cycle of the modulated power signal.

8. The device of claim 6, wherein the energy-collecting circuit comprises a charge pump circuit.

9. The device of claim 6, wherein the device is electrically configured to connect with an audio port of a smart device via the TRRS component.

10. The device of claim 6, further comprising a near field communication (NFC) component configured to transmit and receive radio frequency (RF) signals and decode identifying information from a received RF signal, wherein the NFC component is configured to utilize at least a portion of the energy supplied by the energy-collecting component.

11. The device of claim 10, wherein a second channel of the TRRS component is configured to receive control signals for the NFC component, and a third channel of the TRRS component is configured to communicate the identifying information decoded from the received RF signal.

12. The device of claim 6 further comprising a printed circuit board layout and shape having a square base and rounded end, wherein the NFC antenna is positioned at the rounded end and receives the burst of stored energy.

13. The device of claim 6, further comprising a near field communication (NFC) component configured to transmit and receive radio frequency (RF) signals and decode identifying information from a received RF signal, wherein the NFC component is configured to utilize the stored energy supplied in a burst for transmitting a first RF signal.

14. The system of claim 8, wherein the charge pump circuit comprises a tuned charge pump ladder circuit.

15. A method for providing a near field communication (NFC) session with an NFC-tagged object, comprising:
   receiving a first signal comprising a modulated power signal via a first channel of a tip-ring-ring-sleeve (TRRS) connector;
   providing the first signal to an energy-collecting component comprising an energy-collecting circuit that increases a voltage of the first signal, stores energy from the first signal, and supplies the stored energy in a burst to an NFC component;
   utilizing the burst of stored energy from the first signal to power the NFC component that retrieves information from an NFC tag;
   receiving a second signal via a second channel of the TRRS connector;
   determining one or more control signals from the second signal;
   utilizing the one or more control signals to control the NFC communication component;
   receiving the information retrieved from the NFC tag by the NFC component; and
   communicating at least a portion of the information retrieved from the NFC tag via a third channel of the TRRS connector.

16. The method of claim 15, wherein the energy-collecting circuit comprises a charge pump circuit or a voltage-multiplier circuit.

17. The method of claim 16, wherein the energy-collecting circuit is tuned to correspond to one or more parameters of the modulated power signal.

18. The method of claim 17, wherein the one or more parameters of the modulated power signal include one or more of a frequency, an amplitude, or a duty cycle.

19. The method of claim 15, further comprising utilizing at least a portion of the stored energy to transmit the first RF signal as a burst RF signal.

* * * * *

UNITED STATES PATENT AND TRADEMARK OFFICE
CERTIFICATE OF CORRECTION

PATENT NO. : 10,395,077 B2
APPLICATION NO. : 14/599188
DATED : August 27, 2019
INVENTOR(S) : Max J. Younger and Christian Cochran Page 1 of 1

It is certified that error appears in the above-identified patent and that said Letters Patent is hereby corrected as shown below:

In the Specification

Column 02, Line 15: Please remove "a the" and replace with --the--.
Column 05, Line 01: Please remove "Operating" and replace with --operating--.
Column 08, Line 15: Please remove "is create" and replace with --to access--.
Column 08, Line 19: Please remove "3B" and replace with --4B--.
Column 08, Line 20: Please remove "121" and replace with --120--.
Column 08, Line 28: Please remove "tow" and replace with --toy--.
Column 08, Line 30: Please remove "4B." and replace with --FIG. 4B.--.
Column 08, Line 34: Please remove "175" and replace with --125--.

In the Claims

Column 10, Line 21: Please remove "system" and replace with --device--.

Signed and Sealed this
Eleventh Day of February, 2020

Andrei Iancu
*Director of the United States Patent and Trademark Office*